United States Patent [19]

Arnold et al.

[11] Patent Number: 5,539,041
[45] Date of Patent: Jul. 23, 1996

[54] SILOXANE AND PHOSPHAZENE MODIFIED CYANATE RESIN COMPOSITIONS

[75] Inventors: Cynthia A. Arnold, Derwood, Md.; Paul D. MacKenzie, Chandler, Ariz.

[73] Assignee: Fiberite, Inc., Tempe, Ariz.

[21] Appl. No.: 386,713

[22] Filed: Feb. 9, 1995

Related U.S. Application Data

[63] Continuation of Ser. No. 32,073, Mar. 17, 1993, abandoned, which is a continuation-in-part of Ser. No. 714,125, Jun. 11, 1991, abandoned.

[30] Foreign Application Priority Data

Jun. 11, 1991 [EP] European Pat. Off. ............. 92305339

[51] Int. Cl.$^6$ ................ C08J 5/10; C08K 3/40; C08L 33/14
[52] U.S. Cl. ............ 524/494; 524/506; 524/495; 524/496; 524/492; 524/493; 524/545; 524/546; 523/201; 525/476; 525/393
[58] Field of Search ................... 524/506, 545, 524/546, 495, 496, 492, 493, 494, 449, 442, 448, 450; 523/201; 525/476, 393

[56] References Cited

U.S. PATENT DOCUMENTS

| | | | |
|---|---|---|---|
| 4,552,690 | 11/1985 | Osaki et al. | 252/512 |
| 4,740,343 | 4/1988 | Gaku et al. | 264/225 |
| 4,764,327 | 8/1988 | Nozaki et al. | 264/225 |
| 4,996,267 | 2/1991 | Gerth et al. | 525/423 |
| 5,143,785 | 9/1992 | Pujol et al. | 428/352 |

FOREIGN PATENT DOCUMENTS

| | | |
|---|---|---|
| 412827 | 2/1991 | European Pat. Off. |
| 486197 | 5/1992 | European Pat. Off. |
| 204395 | 3/1992 | WIPO |

*Primary Examiner*—Paul R. Michl
*Assistant Examiner*—U.K. Rajguru
*Attorney, Agent, or Firm*—Gray Cary Ware & Freidenrich

[57] ABSTRACT

Resin compositions comprising inorganic species selected from the group consisting of siloxanes and phosphazenes in combination with and capable of being bonded to thermoset and/or thermoplastic resin system derivable from cyanate functional monomers and/or oligomers. Reacted resin compositions are found to have enriched areas of the inorganic species. The resin compositions have a variety of improved properties including toughness and improved resistance to oxidation.

14 Claims, No Drawings

SILOXANE AND PHOSPHAZENE MODIFIED CYANATE RESIN COMPOSITIONS

This is a continuation of application Ser. No. 08/032,073 filed on Mar. 17, 1993, now abandoned, which is a continuation-in-part of application Ser. No. 07/714,125, filed Jun. 11, 1991, now abandoned.

The present invention is directed to the combination of inorganic species modified resins derived from cyanate functional monomers and/or oligomers in a resin body system.

Material or structural changes in a hostile environment have been a problem that has received much attention from skilled practitioners. In a continuing effort to modify materials to achieve enhanced properties, it has been found in the present invention that modifying certain cyanate functional monomers and/or oligomers with certain inorganic monomeric, oligomeric and/or polymeric species provides a material that, when reacted, is more stable in an oxidizing environment and has increased toughness with other properties remaining unchanged. Materials exhibiting such stability are found useful as structural materials especially for space, aerospace, marine, automotive, electronic and any application wherein a light weight, sturdy material is found advantageous. Additionally, the present invention may be combined with other materials as a coating, as an adhesive, or as a film. The material may be formed into prepreg and later cured into laminar structures.

Heretofore, modification of cyanate resin systems to increase environmental stability has been in the context of organic modifiers, such as epoxy, bismaleimides, polyarylene copolymers. Examples of these kind of modifications are contained in U.S. patent application Ser. No. 07/612,779 filed Nov. 13, 1990, incorporated herein by reference as filed (equivalent to European Patent Application No. 91310167-EP-A-486197). Therein, the modifications were made to increase the toughness of the resin system.

The modifiers of the present invention comprise wholly and/or partially inorganic monomeric, oligomeric and/or polymeric species which are then combined with a cyanate resin system improving the resin body properties in the reacted body.

A cyanate resin body, which may be of a thermoset or thermoplastic nature or be between those extremes, is derived from cyanate functional monomers and/or oligomers. Some cyanate monomers can be advanced to a prepolymer stage wherein up to about 50 percent of the cyanate functional groups react. Effectively, the product of such a reaction contains the triazine moiety and may or may not contain unreacted cyanate functional groups. Further metes and bounds of the cyanate functional groups may be found in the above cited patent application. Furthermore, the cyanate resin system may be comprised of any resin component consistent with the above stated derived product and known to those skilled in this art. In particular, the cyanate functional monomers and/or oligomers consists essentially of cyanate esters of one or more compounds of the general formula NCOAr($Y_xAr_m$)$_q$OCN, wherein m=0 to 5, q=0 to 5 and x=0 up to 2 and wherein Ar is a single or fused aromatic or substituted aromatic and combinations thereof linked in the ortho, meta, and/or para position and Y is a linking unit selected from the group consisting of oxygen, carbonyl, P($R_3R_4R'_4R_5$), Si($R_3R'_4R_6$), sulphur, sulphur oxides, chemical bond, aromatic linked in ortho, meta, and/or para positions and/or $CR_1R_2$, wherein $R_1$ and $R_2$ are hydrogen, halogenated alkanes, and/or substituted aromatics and/or hydrocarbon units wherein said hydrocarbon units are singularly or multiply linked and consist of up to 20 carbon atoms for each $R_1$ and/or $R_2$, $R_3$ and $R_6$ are alkyl, aryl, alkoxy or hydroxy, $R'_4$ may be equal to $R_4$ and a singly linked oxygen or chemical bond and $R_5$ is doubly linked oxygen or chemical bond.

Thus, according to the invention, a resin body comprises an inorganic monomeric, oligomeric and/or polymeric species in combination with and capable of being bonded to and a thermoset and/or thermoplastic resin system derivable at least in part from cyanate functional monomers and/or oligomers.

The inorganic species can be any inorganic species that can be advantageously combined with and bonded to a cyanate resin system. Thus, the inorganic species preferably has reactive functionality, such as amine, hydroxyl, epoxy, cyanate, especially amine, whereby it can react with the reactive species present in the resin body. Preferably, the inorganic species is comprised of elements from group three, group four, group five, and the first transition series of elements from the Periodic Table and/or some combination thereof and therebetween. Most preferably the inorganic species of choice comprise silicon, zirconium, aluminum, titanium, phosphorus and/or some combinations thereof and therebetween, especially siloxanes and phosphazenes. In the preferred siloxane and phosphazene species, the species contain organic pendents groups, typically alkyl, e.g. methyl, ethyl, propyl, aryl, e.g. phenyl, haloalkyl, e.g. per fluoroalkyl, and alkoxy, e.g. methoxy or ethoxy. Thus, the preferred siloxanes and phosphazines can be represented by the formulae:

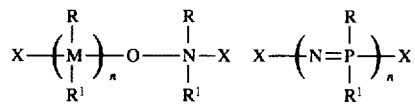

where M=Si or other selected atom, R and $R^1$=organic pendant groups which may be the same or different and X=reactive functionality.

The inorganic species may be present in the resin body from 0.1 to 80 weight percent, preferably 1 to 50, most preferably, 1 to 30 weight percent.

The resin body consists of essentially cyanate functional monomers and/or oligomers, optionally with thermosets and/orthermoplastics. The thermosets and/or thermoplastics may be selected form the group consisting of epoxies, phenolics, arylenes, arylates, imides, esters, maleimides, methacrylates, acrylates, amides, ureas, urethanes, cyanurates, isocyanurates, ketones, sulphones, carbonates, ethers, formals, and/or some combination thereof and/or therebetween.

Preferably, in addition to the cyanate functional monomers and/or oligomers, the resin body comprises epoxies, phenolics, arylates, cyanate maleimides, isocyanurates, and/or some combination thereof. Most preferably, the cyanate functional monomers and/or oligomers from within the general formula NCOAr($Y_xAr_m$)$_q$OCN are selected from the following:

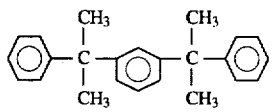

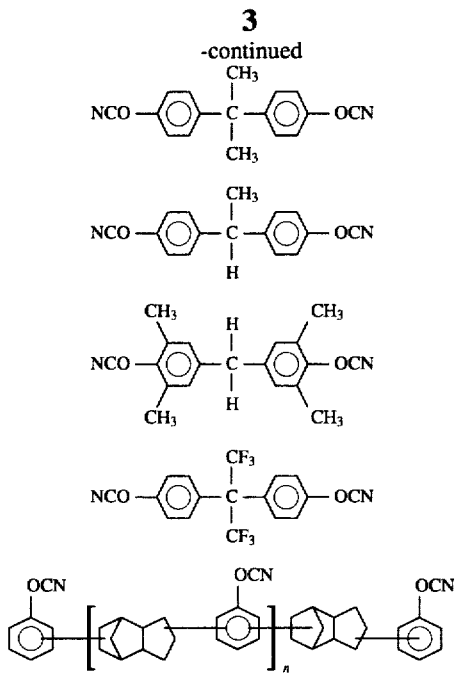

where n is up to 3 and can be fractional; and a rubber modified version of VI; compounds I to V being available as RTX 366, AROCY B-10, AROCY L-10, AROCY M-10, AROCY F-10, respectively, which are obtainable from Rhone-Poulenc and compound VI being available as XU71787.02L and, in its rubber modified form, as XU71787.07L which are obtainable from Dow Chemical.

Advantageously, composite additives may be included in the cyanate resin system providing other properties. Fibres, such as olefins, polytetrafluoroethylene, carbon, glass, quartz, ceramic, and/or aramide fibres and/or some combination thereof and therebetween, may be added to the resin system to strengthen and/or increase the modulus of the resin body. The fibres can be either chopped, continuous, whiskers, and/or some combination thereof and therebetween. Toughening agents such as but not limited to glass beads, elastomers, core-shell particles, polymers, and/or oligomers and/or some combination thereof and therebetween may be added to the resin body. Minerals such as but not limited to vermiculite and/or mica, halogenated components such as but not limited to chloro, bromo, fluoro alkyl and/or phenyl groups, and/or combinations thereof and therebetween may be added to the resin body as a flame retardant.

In its most general form, the resin body is made in the following manner. Simply, the inorganic species is combined with the cyanate resin system by blending the components. After blending, the reactive species present in the resin body may be reacted or cured. The reaction or curing of reactive species present in the resin body is well understood in the art. Typically, for the cyanate functional monomers and/or oligomers, catalysts are selected from active hydrogen sources and from transition metal complexes of metals selected from the first, second and third transition series of the periodic chart. If other reactive species are present, such as epoxy or phenolic precursors, catalysts and hardeners suitable for such species have to be used. Other reaction additives as are known in the art may also be used.

Importantly, the surface composition of the reacted resin body was enriched with the inorganic species. As those skilled in the art will appreciate, part of the problem in modifying resin systems is that an improvement in one property may result in the loss of some other desirable property. In the present invention, it is notable that the cyanate resin body has enhanced oxidation resistance and enhanced toughness with the remaining properties, such as strength, modulus, short beam shear strength, and glass transition temperature remaining relatively unchanged by the modification. It has been observed that the inventive compositions absorb water at a slower sorption rate and exhibit greater hydrophobicity. Additionally, it is known by those skilled in this art that the dielectric loss and dielectric constant characteristically follow the same trend as water sorption. In this instance, the dielectric loss should decrease and the dielectric constant should decrease.

The following examples are intended to further illustrate the invention and are not intended to limit the scope of the invention.

EXAMPLE 1

In Example 1, 5 grammes of bisaminopropyl terminated poly(dimethyl diphenyl)siloxane was dissolved in 10 milliliters of methylene chloride. The siloxane molar composition was 70 percent dimethyl and 30 percent diphenyl. The siloxane molecular weight was about 4,500. This solution was added to 45 grams of RTX 366 (obtained from Rhone-Poulenc) and heated to 100 degrees centigrade to effect solution. The temperature was maintained at 100 degrees centigrade to evaporate the methylene chloride leaving the resin blend. 2.6 weight percent catalyst, copper acetyl acetonate catalyst (about 1% in paranonylphenol) was added based on the cyanate functional monomers and/or oligomers. The resin blend was poured into a steel mould, placed in a vacuum oven and degassed at about 100 degrees centigrade for approximately 1 hour. After degassing the temperature was increased to 121 degrees centigrade and held for 2 hours. The temperature was then increased to 177 degrees centigrade and held at that temperature for 2 hours. The resin body was then allowed to cool to room temperature. The resin body was separated from the mold and analysed.

T-300 carbon fabric (obtained from Toray) was impregnated with the resin body. The resin body was dissolved in methylene chloride and subsequently used to saturate the fabric to obtain a total resin content of 35 weight percent. The fabric was laid up, pressed, and cured.

The resistance to microcracking, an indication of toughness, was determined for the resin body impregnated fabric. Samples which were 12 plies in thickness and dimensionally 0.254 centimeters wide by 0.76 centimeters long were thermally cycled from −180 degrees centigrade to 125 degrees centigrade at 3 degrees centigrade per minute. The temperature were held at the extremes for 15 minutes. The samples were cycled 25 times.

Oxygen plasma stability was determined for 2.54 centimeters square thin films and resin body castings. The samples were degassed for 1 hour at room temperature and weighted for constant weight. The samples were placed in an evacuated test chamber, purged with air and a radio frequency applied to create an oxygen plasma in the vicinity of the samples. The samples were subjected to the oxygen plasma for 1 hour removed and immediately weighed. The etch rate was determined as a function of weight loss per exposed surface area.

Flammability was determined according to Boeing specification 7230 entitle "Determination of Flammability Properties if Aircraft Materials". Water sorption was determined on 0.96 centimeters by 0.95 centimeters by 0.32 centimeters thick resin body castings. The samples were dried to constant weight, immersed into room temperature distilled water and weighted from time to time over 500 hours. At the end of 500 hours the samples were boiled in water and reweighed. Surface profiles were determined by X-ray photoelectron spectroscopy. Samples were cleaned of any surface contamination prior to analysis.

EXAMPLE 2

Example 2 was the same as Example 1 except that 2.5 grammes of bisaminopropyl terminated poly (dimethyl diphenyl) siloxane was added to 47.5 grams of XU71787.02L. The molar composition of the siloxane was 50 percent dimethyl and 50 percent diphenyl. The siloxane molecular weight was about 10,000. The same procedure was followed as in Example 1 except the sample was only partially degassed and that a 2 hour post-cure at 232 degrees centigrade was added after the cure cycle. The same analysis was also followed.

EXAMPLE 3

Example 3 was the same as Example 2 except that the cyanate was changed to 23.75 grammes of XU71787.02L and blended with 23.75 grammess of XU71787.07L. The same procedure was followed as in Example 2. The same analysis was also followed.

EXAMPLE 4

Example 4 was the same as Example 2 except that 2.5 grammes of bisaminopropyl terminated poly(dimethyl diphenyl) siloxane was added to 47.5 grammes of XU71787.02L. The molar composition of the siloxane was 70 percent dimethyl and 30 percent diphenyl. The siloxane molecular weight was about 1,000 grams per mole. The same cure procedure was followed as in Example 1. This Example exhibited arcroscopic phase separation.

EXAMPLE 5

In Example 5, 17.5 grams XU71787.02L, 15 grams of AROCYL L-10, and 5 grams of epoxy were heated at about 100 degrees centigrade to effect solution. 12.5 grams amine terminated thermoplastic, i.e. a 40:60 PES/PEES copolymer of the type described in the aforementioned patent application, which was dissolved in 80 milliliters of methylene chloride was added to the aforesaid cyanate-epoxy resin mixture. 6 grams of bisaminopropyl poly(dimethyl diphenyl) siloxane dissolved in 10 milliliters of methylene chloride was then added to obtain an admixture. The methylene chloride was partially evaporated from the solution, leaving the uncured resin body and about 5 weight percent. The catalyst, as described in Example 1, was added and stirred for 5 minutes. The resin was poured into a steel mould and degassed in a vacuum oven for 0.5 to 2 hours at 100 degrees centigrade, and then the uncured resin body. The resin was cured according to the cure cycle described in Example 2 except that the cure step at 177 degrees centigrade was extended to four hours. The same analysis as employed in Example 2 was used.

EXAMPLE 6

In Example 6, 5 grams of a poly(imide siloxane) random copolymer was dissolved in 20 milliliters of methylene chloride and added to 45 grams of XU71787.021. The copolymer was based upon 10 weight percent of bisaminopropyl terminated polydimethylsiloxane, 5,5'-oxybis-1,3isobenzofurandione,3,3'5 5'tetramethyl 4,4'-[1,4-phenylene-bis-(1-methyl ethylidene)] bisaniline, and phthalic anhydride. The polydimethylsioxane was about 5,000 molecular weight. The cure procedure and analysis followed in Example 2. This Example was marginally homogeneous.

EXAMPLE 7 THROUGH 43

Example 7 through 43 were processed similarly to the above Examples, specifically Example 1 except that when XU71787.02L and/or XU71787.07L were the cyanate of choice the post-cure of Example 5. Table 1 exhibits the compositions of Examples 7 through 43.

TABLE 1

| Example | Siloxane M | Siloxane Composition | Siloxane Concentration | Cyanate Resin |
|---|---|---|---|---|
| 7 | 1,500 | 50:50 | 5 | RTX 366 |
| 8 | 1,500 | 50:50 | 10 | RTX 366 |
| 9 | 1,500 | 50:50 | 5 | 71787.02L |
| 10 | 1,500 | 50:50 | 10 | 71787.02L |
| 11 | 4,500 | 50:50 | 5 | RTX 366 |
| 12 | 4,500 | 50:50 | 10 | RTX 366 |
| 13 | 4,500 | 50:50 | 20 | RTX 266 |
| 14 | 4,500 | 50:50 | 5 | 71787.02L |
| 15 | 4,500 | 50:50 | 10 | 71787.02L |
| 16 | 10,000 | 50:50 | 5 | RTX 366 |
| 17 | 10,000 | 50:50 | 10 | RTX 366 |
| 19 | — | 50:50 | 5 | 71787.02L |
| 19 | 10,000 | 50:50 | 10 | 71787.02L |
| 20 | 10,000 | 50:50 | 5 | 50:50 mix 71787.02L and 71787.07L |
| 21 | 10,000 | 50:50 | 10 | 50:50 mix of Ex. 20 |
| 22 | 4,500 | 60:40 | 5 | RTX 366 |
| 23 | 4,500 | 60:40 | 10 | RTX 366 |
| 24 | 4,500 | 60:40 | 5 | 71787.02L |
| 25 | 4,500 | 60:40 | 10 | 71787.02L |
| 26 | 10,000 | 60:40 | 5 | RTX 366 |
| 27 | 10,000 | 60:40 | 10 | RTX 366 |
| 28 | 10,000 | 60:40 | 5 | 71787.02L |
| 29 | 10,000 | 60:40 | 10 | 71787.02L |
| 30 | 10,000 | 60:40 | 20 | 71787.02L |
| 31 | 10,000 | 60:40 | 5 | 50:50 mix |
| 32 | 10,000 | 60:40 | 10 | 50:50 mix of Ex. 20 |
| 33 | 4,500 | 70:30 | 5 | RTX 366 |
| 34 | 4,500 | 70:30 | 10 | RTX 366 |
| 35 | 4,500 | 70:30 | 5 | 71787.02L |
| 36 | 4,500 | 70:30 | 10 | 71787.02L |
| 37 | 10,000 | 70:30 | 5 | RTX 366 |
| 38 | 10,000 | 70:30 | 10 | RTX 366 |
| 39 | 10,000 | 70:30 | 5 | 71787.02L |
| 40 | 10,000 | 70:30 | 10 | 71787.02L |
| 41 | 10,000 | 70:30 | 5 | 50:50 mix of Ex. 20 |
| 42 | 10,000 | 70:30 | 10 | 50:50 mix of Ex. 20 |
| 43 | 10,000 | 60:40 | 20 | RTX 366 |

In Table 1, the Siloxane Mn is the approximate number average molecular weight of the siloxane component. The Siloxane Composition is the molar ratio of the dimethyl to diphenyl substitution on the silicon atom of the repeat unit. The Siloxane Concentration is the weight percent siloxane present in the resin body. The Cyanate Resin is the type of cyanate resin used in the resin body. It is contemplated herein that the methyl and/or phenyl substituted groups may be in singular and/or a plurality of substitutions with the inorganic species. The range of methyl is about 50 to 70 mole percent and the range of phenyl is about 30 to 50 mole percent.

Table 2 exhibits the results of the x-ray photoelectron spectroscopic analysis of several of the Examples. These results indicate that the surface of the resin body is enriched in silicon on and/or within the surface of the sample. This conclusion is supported by the enhanced silicon signal detected for the silicon atomic concentration within the surface of the sample as determined by the 15 to 90 degree angle sweep analysis. The greater the angle of detection the greater the average depth of detection. It is noted that Example 19 has a bulk concentration of silicon of 0.9 atomic percent ("bulk"). The 15 degree angle indicates that the silicon concentration is 5.7 atomic percent; the 90 degree angle indicates that the silicon concentration is 4.4 atomic percent. For samples of this kind, the depth of detection averages about up to 100 Angstroms for the 90 degree detection angle.

TABLE 2

| Example | Angle | Si Atomic percent |
|---|---|---|
| 19 | 15 | 5.7 |
| 19 | 90 | 4.4 |
| 19 | bulk | 0.9 |
| 29 | 15 | 9.8 |
| 29 | 90 | 7.1 |
| 29 | bulk | 1.0 |
| 40 | 15 | 12.0 |
| 40 | 90 | 7.2 |
| 40 | bulk | 1.3 |

Microcracking is an indication of toughness. The measurement of microcracking is in cracks per inch determined over a two inch sample length. Table 3 exhibits microcracking data indicating that the resin bodies containing siloxane show increased resistance to microcracking.

TABLE 3

| Example | Cracks/inch |
|---|---|
| 71787.02L control | 9.0 |
| 18 | 3.5 |
| 19 | 2.5 |
| RTX 366 control | 1.0 |
| 16 | 0 |
| 17 | 0.5 |

Toughness is also determined by strain energy release rates or $G_{1C}$ values. Table 4 shows toughness values for many of the above Examples. $G_{1c}$ values are given in joules/square meter. $G_{1c}$ values for the 71787.02L control was 160 and for the RTX 366 control was 716. The value for the mix of the two 50:50 cyanate resins mixed as in Example 20 was 530.

TABLE 4

| Example | $G_{1c}$ value | Example | $G_{1c}$ value |
|---|---|---|---|
| 7 | 866 | 23 | 947 |
| 8 | 990 | 24 | 321 |
| 9 | 282 | 25 | 338 |
| 11 | 913 | 33 | 718 |
| 12 | 738 | 34 | 1196 |
| 14 | 319 | 36 | 461 |
| 15 | 375 | 43 | 3713 |
| 18 | 173 | 28 | 335 |
| 19 | 187 | 29 | 330 |
| 20 | 606 | 16 | 912 |
| 21 | 686 | 17 | 1022 |
| 22 | 924 | 31 | 603 |

TABLE 4-continued

| Example | $G_{1c}$ value | Example | $G_{1c}$ value |
|---|---|---|---|
| 26 | 834 | 32 | 587 |
| 27 | 1046 | | |

The equilibrium water sorption data indicates that siloxane incorporation results in more hydrophobic resin bodies. For example, the RTX 366 sorbs 0.64 weight percent water whereas in Example 17 0.61 weight percent water is sorbed. The 71787.02L sorbs 0.99 weight percent water whereas in Example 19 0.81 weight percent water is sorbed. The 0.03 weight percent difference in Example 17 is significant as is the value differential for Example 19.

The stability of the resin bodies in an oxidizing environment is given in Table 5. The units are given in measurement of weight loss per exposed surface area in micrograms per square centimeters. The lower etch rate indicates greater stability in an oxidizing environment.

TABLE 5

| Example | etch rate, film | etch rate, resin |
|---|---|---|
| 71787.02L | | 284 |
| 50:50 cyanate mix (Example 20) | 630.5 | |
| 18 | 298.5 | 101 |
| 19 | 246 | 82.5 |
| RTX 366 | | 215 |
| 16 | 398.5 | |
| 17 | | 92 |

Flammability was improved by siloxane incorporation. The burn length of 71787.02L was 3.30 centimeters, whereas in Example 19 the burn length was 3.05 centimeters. The burn length of RTX 366 was 2.29 centimeters, whereas in Example 17 the burn length was 2.03 centimeters. The burn length of the 50:50 cyanate resin prepared as in-Example 20 was 3.30 centimeters, whereas in Example 21 the burn length was 2.79 centimeters.

The thermal and mechanical properties of the resin bodies compared very favorably to samples not combined with the siloxane component. As such, it is concluded that the addition of siloxane to the cyanate resin system herein disclosed has few significant disadvantageous effects on mechanical and/or thermal properties of the resultant resin bodies.

We claim:

1. A curable resin composition comprising an inorganic species having reactive functionality selected from the group consisting of siloxanes and phosphazenes in combination with and capable of being bonded to a thermoset and/or thermoplastic resin system derivable at least in part from cyanate functional monomers and/or oligomers.

2. A resin body according to claim 1 wherein said siloxanes and phosphazenes comprise pendent organic groups, preferably organic groups selected from the group consisting of alkyl, haloalkyl, alkoxy and aryl, especially methyl and/or phenyl.

3. A resin body according claim 1 wherein said inorganic species have reactive functionality.

4. A resin composition according to claim 1 wherein said cyanate functional monomers and/or oligomers consist essentially of cyanate esters of one or more compounds of the general formula $NCOAr(Y_xAr_m)_qOCN$, wherein m=0 to 5, q=0 to 5 and x=0 up to 2 and wherein Ar is a single or fused aromatic or substituted aromatic and combinations thereof linked in the ortho, meta, and/or para position and Y is a linking unit selected from the group consisting of oxygen, carbonyl, $P(R_3R_4R'_4R_5)$, $Si(R_3R_4R'_4R_6)$, sulphur, sulphur oxides, and $CR_1R_2$, wherein $R_1$ and $R_2$, are hydrogen, halogenated alkanes, and/or substituted aromatics and/ or hydrocarbon units wherein said hydrocarbon units are singularly or multiply linked and consist of up to 20 carbon atoms for each $R_1$ and/or $R_2$, $R_3$ and $R_6$ are alkyl, aryl, alkoxy or hydroxy, $R'_4$ may be equal to $R_4$ and a singly linked oxygen or chemical bond and $R_5$ is doubly linked oxygen or chemical bond.

5. A resin body according to claim 1 wherein said cyanate functional monomers and/or oligomers consist essentially of one or more of the following compounds:

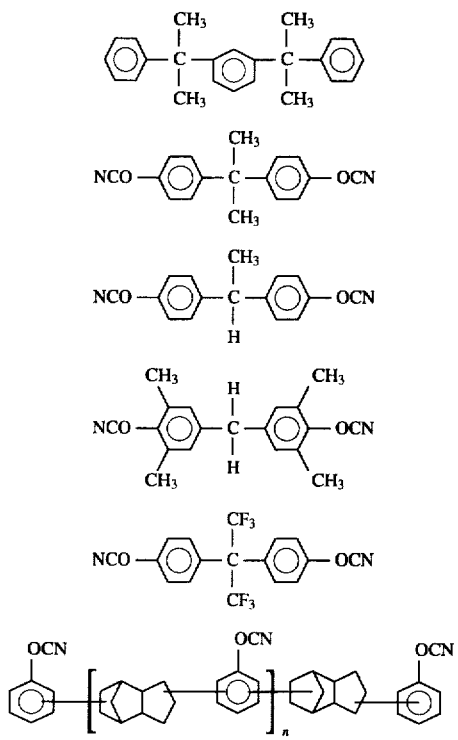

where n is up to 3 and can be fractional.

6. A resin body according to claim 1 wherein said resin body further optionally comprises thermoset and/or thermoplastic components selected from the group consisting of epoxies, phenolics, arylenes, arylates, imides, esters, maleimides, methacrylates, acrylates, amides, ureas, urethanes, cyanates, isocyanurates, cyanurates, ketones, sulphones, carbonates, ethers, formals, and/or some combination thereof and/or therebetween.

7. A resin composition according to claim 1 wherein said composition comprises reinforcement additives in the form of fibers selected from olefins, polytetrafluoroethylene, carbon, glass, ceramic, aramide and some combination thereof.

8. A resin body according to claim 7 wherein said fibres am chopped, continuous, whiskers and/or some combination thereof and therebetween.

9. A resin body according to claim 1 wherein said body comprises toughening agents selected from the group glass beads, polymers and/or oligomers, core-shell particles, elastomers, and/or some combination thereof and therebetween.

10. A resin body according to claim 1 wherein said body comprises flame retardant additives consisting essentially of the group selected from minerals, halogenated components and/or some combination thereof and therebetween.

11. A resin body according to claim 1 wherein said body comprises continuous filaments and is in the form of a prepreg.

12. A resin body according to claim 1 wherein reactive species present in said body have been reacted.

13. A resin composition according to claim 12 wherein the outer surface area of said resin composition has enhanced oxidation resistance and enhanced toughness with said inorganic species.

14. A resin composition according to claim 13 wherein said enhanced outer surface area comprises an enhanced area to a depth of about 100 Angstroms of said outer surface area.

\* \* \* \* \*